United States Patent [19]
Boek et al.

[11] Patent Number: 5,468,692
[45] Date of Patent: Nov. 21, 1995

[54] NON-BROWNING CATHODE RAY TUBE GLASSES

[75] Inventors: Heather Boek, Corning; Nicholas F. Borrelli, Elmira; George F. Hares, Corning, all of N.Y.

[73] Assignee: Corning Incorporated, Corning, N.Y.

[21] Appl. No.: 358,477

[22] Filed: Dec. 19, 1994

[51] Int. Cl.⁶ .................................................. C03C 3/095
[52] U.S. Cl. ............................ 501/64; 501/69; 313/480; 252/478
[58] Field of Search ....................... 501/64, 69; 252/478; 313/480

[56] References Cited

U.S. PATENT DOCUMENTS

| | | |
|---|---|---|
| 2,477,329 | 7/1949 | DeGier et al. |
| 3,464,932 | 9/1968 | Connelly et al. |
| 3,805,107 | 4/1974 | Boyd. |
| 4,277,286 | 7/1981 | Boyd et al. |
| 4,337,410 | 6/1982 | Van der Geer et al. |
| 4,734,388 | 3/1988 | Cameron et al. |
| 4,830,990 | 5/1989 | Connelly. |
| 5,108,960 | 4/1992 | Boek et al. |
| 5,215,944 | 6/1993 | Jones. |

*Primary Examiner*—Karl Group
*Attorney, Agent, or Firm*—Angela N. Nwaneri; Clinton S. Janes, Jr.

[57] ABSTRACT

This invention is directed to glass compositions particularly designed for use in rear projection tube applications. The glass compositions are essentially free from ZnO, PbO and other easily reducible metal oxides other than $Sb_2O_3$ and are essentially colorless. The glasses exhibit essentially no browning discoloration upon being exposed to high voltage electrons, linear coefficients of thermal expansion (25°–300° C.) between about $97-100\times10^{-7}$° C., annealing points not lower than about 475° C., strain points not lower than about 440° C., electrical resistivities expressed as Log R greater than 9 at 250° C. and greater than 7 at 350° C., and liquidus temperatures below about 1100° C. The glass compositions consist essentially, expressed in terms of weight percent on the oxide basis, of

| | | | |
|---|---|---|---|
| $SiO_2$ | 55–60 | $K_2O$ | 5.75–10 |
| $Al_2O_3$ | 1–3 | $Na_2O + K_2O$ | 10.5–14 |
| $ZrO_2$ | 0–3.5 | $K_2O/Na_2O$(wt) | 1.6–2.6 |
| $Li_2O$ | 0.6–2 | $K_2O/Na_2O$(mol) | >1 |
| $SrO$ | 7.5–13.5 | $CeO_2$ | 0.5–1 |
| $BaO$ | 14–16 | $TiO_2$ | 0.25–1 |
| $Na_2O$ | 3–5 | $Sb_2O_3$ | 0.15–0.5 |

4 Claims, No Drawings

NON-BROWNING CATHODE RAY TUBE GLASSES

FIELD OF THE INVENTION

This invention is directed to glass compositions designed for use in cathode ray tube applications and, more particularly, to glass compositions which are to be used in rear projection tube applications. The glasses are highly resistant to "browning"; that is, the visible darkening of the area of glass exposed to a focussed beam of high voltage electrons conventionally associated with electron and x-ray damage to a glass surface.

BACKGROUND OF THE INVENTION

The development of unwanted browning in a surface of a glass has long been recognized as resulting from the exposure of the glass to the bombardment of electrons thereupon, with the concomitant generation of x-radiation. The subjection of the glass to x-radiation results in a phenomenon which has been termed x-ray browning. That phenomenon has been defined as a temporary darkening of a glass surface because of damage caused by the exposure thereto of x-radiation. In contrast, the impingement of high voltage electrons on a glass causes a permanent discoloration (browning) in the surface thereof.

The use of ceric oxide ($CeO_2$) to inhibit discoloration by x-radiation was disclosed in U.S. Pat. No. 2,477,329 (DeGier et al.). Titania ($TiO_2$) was discovered to be an effective supplement for, but not a total replacement for, $CeO_2$. Therefore, to minimize the amount of $CeO_2$ utilized, because of its high cost, a combination of $CeO_2$ and $TiO_2$ is customarily employed. Because $TiO_2$ can impart color to the glass in large amounts, the total thereof will not exceed about 1%.

At least two theories have been proposed to explain the phenomenon of electron browning. The first theory contemplates the reduction of some chemical species to its metallic state. This theory was also disclosed in U.S. Pat. No. 2,477,329, supra, which proposed minimizing the concentrations of readily reducible metal oxides, especially lead oxide, in the glass composition. A more recent theory envisions the creation of damage within the atomic arrangement of the glass structure where the glass composition is free from easily reducible oxides.

In view of the above factors, glasses designed to be used as faceplates for cathode ray tubes, such as television picture tubes and rear projection tubes, have customarily contained $CeO_2$, with or without $TiO_2$, and have been relatively free from readily reducible metal oxides such as lead oxide.

As the operating electron voltages of the tubes have been raised, there has been the need to increase the x-radiation absorption capability of the faceplate glass to protect the viewer, and to increase the resistance of the glass to browning by x-radiation and by electron bombardment. As can be appreciated, however, the glass compositions must also satisfy a matrix of chemical and physical characteristics to meet the requirements of the tube manufacturer, as well as the melting and forming properties demanded by the glass manufacturer to shape the glass into desired configuration. Accordingly, the glass will customarily exhibit a linear coefficient of thermal expansion over the temperature range of 25°–300° C. between about $97-100\times10^{-7}/°$ C., an annealing point not lower than about 475° C., a strain point not lower than about 440° C., and an electrical resistivity expressed in Log R that is greater than 9 at 250° C. and greater than 7 at 350° C. The glass will demonstrate a liquidus temperature below about 1100° C.

Therefore, the principal objective of the present invention was to enhance the resistance of glasses designed for use as cathode ray tube faceplates to browning from exposure to x-radiation and electron bombardment, while maintaining the chemical and physical properties, as well as the melting and forming behaviors, conventionally present in glass compositions designed for use as cathode ray tube faceplates.

SUMMARY OF THE INVENTION

Prior to 1968, glass compositions destined for use as cathode ray tube faceplates utilized barium oxide (BaO) as the primary x-radiation absorption component. U.S. Pat. No. 3,464,932 (Connelly et al.) pointed out the improved efficiency of strontium oxide (SrO) as an x-radiation absorber over the vital 0.35–0.7 Å range of wavelengths. Nevertheless, because of the need to maintain the above-recited properties in the glass, SrO was not totally substituted for BaO, but, instead, a combination of BaO and SrO has been utilized, the proportions of each being varied over a considerable range as to which the numerous patents that have been granted since U.S. Pat. No. 3,464,932, supra, will attest. Most of those patents have utilized $CeO_2$ with or without $TiO_2$ to inhibit x-radiation browning, and have omitted easily reducible metal oxides to reduce electron browning. To illustrate:

U.S. Pat. No. 3,464,932 discloses glasses consisting essentially, in weight percent, of

| | | | |
|---|---|---|---|
| $SiO_2$ | 40–70 | SrO | Up to 20 |
| $Na_2O$ | 0–10 | $Na_2O+K_2O+SrO+SiO_2$ | ≧70 |
| $K_2O$ | 0–13 | BaO | 0–20 |
| $Na_2O+K_2O$ | 4–20 | MgO+CaO+ZnO | 0–15 |
| $ZrO_2$ | 0–10 | $Al_2O_3$ | 0–10. |

U.S. Pat. No. 3,805,107 (Boyd) describes glasses consisting essentially, in weight percent, of

| | | | | | |
|---|---|---|---|---|---|
| SrO | 5–20 | $K_2O+Na_2O$ | 8–20 | MgO | 0–5 |
| BaO | 0–15 | $Li_2O$ | 0.2–2 | $TiO_2$ | 0.25–2 |
| SrO+BaO | 5–20 | $Al_2O_3$ | 1.5–4 | $CeO_2$ | 0.05–0.5 |
| $K_2O$ | 4–13 | CaO | 0–5 | $SiO_2$ | balance. |
| $Na_2O$ | 4–13 | | | | |

U.S. Pat. No. 4,277,286 (Boyd et al. ) refers to glasses essentially free from PbO and other readily-reducible metal oxides and consist essentially, in weight percent, of

| | | | |
|---|---|---|---|
| $SiO_2$ | 43–55 | CaO | 0–5 |
| $Al_2O_3$ | 0–4 | SrO | 2–14 |
| ZnO | 5–12 | BaO | 10–20 |
| $Li_2O$ | 0.5–3 | CaO+SrO+BaO | 16–30 |
| $Na_2O$ | 4–8 | $CeO_2$ | 0.3–1 |
| $K_2O$ | 3–8 | $ZrO_2$ | 2–8. |
| $Li_2O+Na_2O+K_2O$ | 10–18 | | |

U.S. Pat. No. 4,337,410 (Van der Geer et al.) records glasses consisting essentially, in weight percent, of

| | | | |
|---|---|---|---|
| $SiO_2$ | 57–65 | $ZrO_2$ | 1–4 |
| $Al_2O_3$ | 0–4 | SrO | 6–14 |
| $Na_2O$ | 5.5–8 | PbO | 0–1 |
| $K_2O$ | 7.5–10 | $As_2O_3+Sb_2O_3$ | 0–2 |
| MgO | 0–4 | $TiO_2$ | 0.2–2 |
| CaO | 0–4 | $CeO_2$ | 0.05–1 |
| BaO | 5–13 | | | wherein $Na_2O:Na_2O+K_2O=0.4-0.47$ and $BaO+2SrO+2ZrO_2+3PbO>32$.

U.S. Pat. No. 4,734,388 (Cameron et al.) reports glasses consisting essentially in weight percent, of

| | | | | | |
|---|---|---|---|---|---|
| $SiO_2$ | 60–63 | BaO | 5.5–8.5 | $Al_2O_3+ZrO_2$ | >4–6.25 |
| $Li_2O$ | 0.25–0.8 | CaO | 1.5–4 | $Sb_2O_3$ | 0.25–0.55 |
| $Na_2O$ | 7.25–9.25 | $TiO_2$ | 0.25–0.75 | $As_2O_3$ | 0–0.25 |
| $K_2O$ | 6–8.25 | $ZrO_2$ | 4–6.25 | $Sb_2O_3+As_2O_3$ | 0.35–0.75 |
| SrO | 5.5–8.5 | $Al_2O_3$ | 0–<2 | $CeO_2$ | 0.15–0.5 |

U.S. Pat. No. 4,830,990 (Connelly) presents glasses consisting essentially, in weight percent, of

| | | | |
|---|---|---|---|
| $Li_2O$ | 0.75–3 | $Li_2O+Na_2O+K_2O$ | 11–16 |
| $Na_2O$ | 5–7 | $CaO+SrO+BaO$ | 21.5–26 |
| $K_2O$ | 5–7 | $Al_2O_3$ | 1–2 |
| SrO | 7.5–10 | $ZrO_2$ | 2–7 |
| BaO | 14–16 | $CeO_2$ | 0.4–0.8 |
| CaO | 0–3 | $SiO_2$ | 55–60 |

U.S. Pat. No. 5,108,960 (Boek et al.) recites glasses consisting essentially, in weight percent, of

| | | | |
|---|---|---|---|
| $SiO_2$ | 60–65 | SrO | 8–12 |
| $Al_2O_3$ | 0–3 | BaO | 8–12 |
| $Na_2O$ | 6.5–8 | $SrO+BaO$ | 16–21 |
| $K_2O$ | 6.5–10 | ZnO | 1–8 |
| CaO+MgO | 0–3 | $CeO_2$ | 0.1–1 |
| $Sb_2O_3$ | 0.1–1 | $TiO_2$ | 0.1–1 |

U.S. Pat. No. 5,215,944 (Jones) sets out glasses consisting essentially, in weight percent, of

| | | | |
|---|---|---|---|
| $SiO_2$ | 57–66 | $Na_2O+K_2O$ | 10–18 |
| $Al_2O_3$ | 0–5 | SrO | 11–21 |
| $SiO_2+Al_2O_3$ | 57–68 | BaO | 0–13 |
| $Na_2O$ | 4–8 | $SrO+BaO$ | 16–24 |
| $K_2O$ | 7–11 | $CeO_2$ | 0.1–1 |

As is immediately evident from even a cursory review of the above patents, the base compositions for faceplate glasses have generally been composed of $Na_2O+K_2O+SrO+BaO+SiO_2$ with frequent optional additions of $Al_2O_3$, CaO, MgO, ZnO, $ZrO_2$, and a fining agent.

It has been explained above that, as the voltages of the electron beams have been raised, the degree of electron browning has increased. In order to better understand the mechanism underlying the phenomenon of electron browning, a laboratory investigation was conducted, the results of which are reported below.

It was observed that, when the surface of the alkali metal ion-containing faceplate glass is bombarded with high energy electrons, a negative space charge is produced. In response to that negative space charge, positively charged alkali metal ions are attracted thereto. That attraction results in a layer depleted of alkali metal ions as they are drawn to below the surface of the glass. The depth of the space charge can be estimated as being proportional to the square of the accelerating voltage divided by the density of the glass. The degree of browning appears to worsen in glass samples with more extensively alkali metal ion-depleted layers. Secondary Ion Mass Spectrometry (SIMS) was utilized to provide a profile of alkali metal ion concentration as a function of depth into a region exposed to electrons. SIMS profiles were obtained of a sample of a faceplate glass commercially marketed by Corning Incorporated, Corning, New York as Code 9039 that had been exposed to a source of high velocity electrons (32 kilovolts, 0.5 mA/16 cm$^2$, 72 hours), and on a sample of the same glass that had not been so exposed. Corning Code 9039 glass has the following approximate composition, expressed in terms of weight percent on the oxide basis:

| | | | | | |
|---|---|---|---|---|---|
| $SiO_2$ | 57.55 | $Na_2O$ | 6.31 | BaO | 15.02 |
| $Al_2O_3$ | 1.73 | $K_2O$ | 5.71 | $CeO_2$ | 0.66 |
| $ZrO_2$ | 2.99 | SrO | 8.66 | $Sb_2O_3$ | 0.40 |
| $Li_2O$ | 0.99 | | | | |

Examination of the two profiles showed that the uppermost 1.6 μm of the Code 9039 glass sample exposed to the electron beam was severely depleted in alkali metal ions with very little change in the concentrations of the remaining components. It is conjectured that electrons penetrate to a depth of about 1.6 μm into the glass and attract the mobile and positively charged alkali metal ions, thereby leaving a $SiO_2$-rich top region overlying an alkali metal ion-depleted zone. The browning discoloration results from the reducing effect of the free ions.

That investigation led to the hypothesis that the migration of the alkali metal ions constitutes the primary cause of electron browning, resulting in the conclusion that either an alkali metal-free glass composition or one with low alkali metal ion mobility would be optimal as a faceplate. Three samples of glasses essentially free from alkali metal ions exhibited no evidence of browning after exposure to an electron beam. Those findings are believed to confirm the above hypothesis. Thus, if the bombarding electrons are not somehow electrically compensated (as by the presence of alkali metal ions), the glass surface will then build up a charge and repel any further electrons. Ultimately, the electrons will diffuse back to the surface of the faceplate and discharge through the grounding film.

Inasmuch as those three alkali metal-free glass compositions contained no $CeO_2$, each exhibited browning when exposed to x-radiation. The fact that no x-radiation browning was observed as a consequence of exposure to a high voltage electron beam, however, supports the explanation that, after the initial exposure to electrons which charged the glass, no further electrons entered the glass and, hence, no x-radiation was produced.

Nevertheless, it was appreciated that the presence of between about 12.5–15% total of alkali metal oxides had been demanded in glass compositions designed for use as faceplates to impart the desired properties thereto. Because of the recognized high mobility of sodium ions, an investigation was undertaken to reduce the concentrations thereof with concomitant increases in the levels of the larger, less mobile potassium ions. As a result of that investigation, a significant reduction in the extent of electron browning was found to be possible utilizing $Na_2O$ contents between about 3–5% $Na_2O$ and a $K_2O$ level such that the weight ratio $K_2O:Na_2O$ ranges about 1.6–2.6 and the molar ratio $K_2O:Na_2O>1$. Those changes in $Na_2O$ and $K_2O$ contents necessitated alterations in the ranges of the other components.

As was noted above, the addition of cerium to the glass furnishes protection against x-radiation darkening. It is believed that the $Ce^{3+}/Ce^{4+}$ transition provides competitive traps that do not absorb at visible wavelengths. Hence, a ceria level of at least 0.5% $CeO_2$ is present. $TiO_2$ performs as a high temperature flux and acts in concert with ceria to reduce solarization and x-radiation browning. Consequently, more than 0.25% $TiO_2$ will be included. Additions of $CeO_2$ in amounts in excess of about 1% and $TiO_2$ also at levels greater than about 1% hazard imparting color (yellow/brown) to the glass, thereby lowering its initial transmission and, in the case of color projection, disturbing the purity of the color. Nevertheless, in the preferred glass compositions, the sum $CeO_2+TiO_2>1$. Finally, because easily reducible metal oxides contribute significantly to electron browning, the concentration of $Sb_2O_3$ to perform as a fining agent will not exceed about 0.5% and will preferably not exceed about 0.3%.

In sum, the inventive glasses not only demonstrate excellent resistance to electron browning, but also exhibit linear coefficients of thermal expansion over the temperature range of 25°–300° C. between about $97-100\times10^{-7}/°$ C., annealing points not lower than about 475° C., strain points not lower than about 440° C., and electrical resistivities expressed as Log R greater than 9 at 250° C. and greater than 7 at 350° C. With respect to melting and forming capabilities, the inventive glasses exhibit liquidus temperatures below about 1100° C.

The inventive glass compositions are essentially colorless as formed, are essentially free from ZnO, PbO and other readily reducible metal oxides, except for the inclusion of $Sb_2O_3$ as a fining agent, exhibit essentially no browning discoloration upon being exposed to high voltage electrons, and consist essentially, expressed in terms of weight percent on the oxide basis, of about

| | | | |
|---|---|---|---|
| $SiO_2$ | 55–60 | $K_2O$ | 5.75–10 |
| $Al_2O_3$ | 1–3 | $Na_2O+K_2O$ | 10.5–14 |
| $ZrO_2$ | 0–3.5 | $K_2O/Na_2O$(wt) | 1.6–2.6 |
| $Li_2O$ | 0.6–2 | $K_2O/Na_2O$(mol) | >1 |
| SrO | 7.5–13.5 | $CeO_2$ | 0.5–1 |
| BaO | 14–16 | $TiO_2$ | 0.25–1 |
| $Na_2O$ | 3–5 | $Sb_2O_3$ | 0.15–0.5. |

As used herein, "essentially colorless" and "exhibit essentially no browning discoloration" indicates that there is no color present in the glass in an amount sufficient to be readily perceptible visually. Also as used herein, "essentially free from" indicates that the amount, if any, present of the metal oxide is so small as to have no substantive effect upon the properties of the glass. Such amounts customarily contemplate impurity levels.

PRIOR ART

It is believed that the several patents referred to above comprise the most relevant prior art.

DESCRIPTION OF PREFERRED EMBODIMENTS

Table I relates a group of glass compositions, expressed in terms of parts by weight on the oxide basis, illustrating the present inventive glasses. Inasmuch as the total of the individual constituents closely approximates 100, for all practical purposes the values reported in Table I may be deemed to reflect weight percent. Furthermore, the actual batch ingredients may comprise any materials, either oxides or other compounds, which, when melted together, will be converted into the desired oxide in the proper proportions. For example, $LiCO_3$ and $SrCO_3$ may provide the sources of $Li_2O$ and SrO, respectively. The weight ratio $K_2O/Na_2O$ (wt) and the molar ratio $K_2O/Na_2O$ (Mol) are provided for each composition.

The batch components were compounded, thoroughly blended together in a turbula mixer to assist in securing a homogeneous melt, and then charged into platinum crucibles. The crucibles were moved into a furnace operating at about 1550° C. and the batches melted for about four hours. Thereafter, the melts were poured into steel molds to form glass slabs having the dimensions of about 20.3×10.2×1.3 cm (8"×4"×0.5") and those slabs were transferred immediately to an annealer operating at about 493° C. The analyses of three glasses commercially marketed for rear projection tube applications are included for comparative purposes (Examples A, B, and C).

It will be appreciated that the above description reflects laboratory practice only. The compositions recorded in Table I can be melted and formed in much larger quantities employing conventional commercial glass melting units and glass forming techniques. It is only necessary that the batches be heated to a sufficiently high temperature to melt the batches and held at that temperature for a sufficient length of time to obtain a homogeneous melt, and thereafter the melt is cooled and simultaneously shaped into a glass body of a desired configuration.

TABLE I

| | 1 | 2 | 3 | 4 | 5 |
|---|---|---|---|---|---|
| $SiO_2$ | 56.77 | 56.1 | 57.2 | 56.8 | 57.2 |
| $Li_2O$ | 1.23 | 1.2 | 1.1 | 0.69 | 1.69 |
| $Na_2O$ | 3.69 | 3.7 | 4.29 | 3.82 | 4.23 |
| $K_2O$ | 8.71 | 9.29 | 8.69 | 8.48 | 6.88 |
| SrO | 8.44 | 8.65 | 8.65 | 10.8 | 10.3 |
| BaO | 14.8 | 15.0 | 15.0 | 14.8 | 15.0 |
| CaO | *0.02 | — | — | — | — |
| $Al_2O_3$ | 1.98 | 1.73 | 1.73 | 1.75 | 1.75 |
| $ZrO_2$ | 3.07 | 2.99 | 2.0 | 1.5 | 1.49 |
| $CeO_2$ | 0.75 | 0.66 | 0.66 | 0.68 | 0.68 |
| $TiO_2$ | 0.36 | 0.4 | 0.4 | 0.39 | 0.39 |
| $Sb_2O_3$ | 0.17 | 0.2 | 0.2 | 0.2 | 0.2 |
| MgO | *0.01 | — | — | — | — |
| $K_2O/Na_2O$ (Wt) | 2.36 | 2.51 | 2.03 | 2.22 | 1.63 |
| $K_2O/Na_2O$ (Mol) | 1.55 | 1.65 | 1.33 | 1.46 | 1.07 |

| | 6 | 7 | A | B | C |
|---|---|---|---|---|---|
| $SiO_2$ | 57.5 | 54.1 | 56.3 | 55.98 | 57.13 |
| $Li_2O$ | 0.19 | 1.2 | 1.01 | 1.43 | 1.0 |
| $Na_2O$ | 4.01 | 3.7 | 3.99 | 3.19 | 6.42 |
| $K_2O$ | 7.69 | 9.29 | 8.94 | 8.63 | 5.8 |
| SrO | 13.0 | 8.65 | 9.96 | 7.68 | 8.61 |

TABLE I-continued

| | | | | | |
|---|---|---|---|---|---|
| BaO | 14.5 | 15.0 | 12.89 | 13.06 | 15.03 |
| CaO | — | — | 0.16 | 0.06 | *0.04 |
| $Al_2O_3$ | 1.75 | 1.73 | 2.07 | 0.42 | 1.74 |
| $ZrO_2$ | — | 2.99 | 2.03 | 1.6 | 3.01 |
| $CeO_2$ | 0.68 | 0.66 | 0.5 | 0.54 | 0.73 |
| $TiO_2$ | 0.39 | 0.4 | 0.41 | 0.29 | *0.02 |
| $Sb_2O_3$ | 0.2 | 0.2 | 0.36 | 0.24 | 0.45 |
| MgO | — | — | 0.03 | — | *0.01 |
| ZnO | — | 2.0 | 1.31 | 6.82 | — |
| $K_2O/Na_2O$ (Wt) | 1.92 | 2.51 | 2.24 | 2.71 | 0.90 |
| $K_2O/Na_2O$ (Mol) | 1.26 | 1.65 | 1.47 | 1.78 | 0.59 |

*Impurity only. Not intentionally added to glass batch.

Specimens were cut from the annealed glass slabs, and electrical resistivity and physical properties were measured thereon utilizing techniques conventional in the glass art. The linear coefficient of thermal expansion over the 25°–300° C. temperature interval (Exp.) is reported in terms of $\times 10^{-7}/°$ C.; the softening point (S.P.), the anneal point (A.P.) and strain point (St.P.) are reported in terms of °C.; the density (Dens.) is presented in terms of grams/cm$^3$; the x-ray absorption coefficient at a wavelength of 0.6 Å (mm) entered in terms of cm$^{-1}$; and the electrical resistivities, measured at 250° C. and 350° C., are expressed in terms of Log R 250 and Log R 350, respectively. The electrical resistivity exhibited by a glass is utilized to provide a measure of the mobility of the alkali metal ions. The internal liquidus temperature (Liq.) is expressed in °C. Some similar measurements were made on pieces of the commercially marketed glasses.

TABLE II

| | 1 | 2 | 3 | 4 | 5 |
|---|---|---|---|---|---|
| S.P. | 6.86 | 690 | 680 | 703 | 667 |
| A.P. | | 512 | 500 | 522 | 496 |
| St.P | | 471 | 460 | 481 | 458 |
| Exp | 96.6 | 97.4 | 98.8 | 97.2 | 98.0 |
| Dens | 2.9191 | 2.913 | 2.5 | 2.913 | 2.913 |
| Log $R_{250}$ | | 10.65 | 10.47 | 10.77 | 10.45 |
| Log $R_{350}$ | | 8.58 | 8.43 | 8.71 | 8.39 |
| Liq | | 1085 | 940 | 935 | 885 |
| mu | 39.05 | 39.28 | 31.63 | 38.75 | 37.77 |

| | 6 | 7 | A | B | C |
|---|---|---|---|---|---|
| S.P. | 719 | 690 | 690 | 672 | 670 |
| A.P. | 536 | 510 | | | |
| St.P | 492 | 468 | | | |
| Exp | 97.1 | 97.1 | 97.2 | 95.9 | 98.6 |
| Dens | 2.918 | 2.959 | 2.9101 | 2.9616 | 2.9306 |
| Log $R_{250}$ | 10.76 | 10.75 | | | |
| Log $R_{350}$ | 8.76 | 8.67 | | | |
| Liq | 970 | 1125 | | | |
| mu | 38.27 | 41.43 | 38.49 | 38.95 | 38.95 |

Besides qualitatively visually inspecting the loss in transmission experienced by the glasses after the impingement of high voltage electrons thereupon, several of the glasses were subjected to a test procedure permitting a quantitative evaluation of the loss of transmittance at three different wavelengths of visible radiation. The test procedure involved exposing ground and polished glass specimens having a thickness of 4.85–4.86 mm to an electron beam exposure carried out at 32 kilovolts and 0.5 mA/16 cm$^2$ for 72 hours. Prior to the exposure the specimens were coated with a green phosphor and metallic aluminum, and heat treated for 30 minutes at 430° C.

Each of Examples 1–6 evidenced very little visual evidence of darkening after exposure to high voltage electrons, whereas Examples 7 and A-C exhibited considerable discoloration. Examples 1 and A-C were subjected to the above-described testing procedure. Table III reports the ratio in percent of the transmittance before and the transmittance after the 72 hour exposure at three different wavelengths of visible radiation, viz., 450 nm, 546 nm, and 638 nm.

TABLE III

| | 1 | A | B | C |
|---|---|---|---|---|
| % 450 nm | 89.5 | 27.5 | 22.3 | 33.0 |
| % 546 nm | 95.1 | 51.4 | 48.6 | 50.9 |
| % 638 nm | 97.9 | 69.0 | 65.3 | 58.7 |

The differences in composition between the present inventive glasses and those of Examples 7 and A-C are relatively slight in specific amounts, but their very substantial effect upon the resistance of the glass to discoloration by the impact of high voltage electrons is self-evident. As can be seen, Example 7 contains ZnO. Both Examples A and B contain ZnO and have a low BaO content. Example C contains essentially no Ti, has a high $Na_2O$ concentration, and has a low molar $K_2O/Na_2O$ ratio. It is quite apparent that the present inventive glasses are significantly less damaged and discolored than those glasses having compositions outside of the required ranges.

Example 1 is considered to be the most preferred glass composition.

What is claimed is:

1. A glass essentially free from ZnO, PbO and other easily reducible metal oxides other than $Sb_2O_3$ which is essentially colorless, and which exhibits essentially no browning discoloration upon being exposed to high voltage electrons, a linear coefficient of thermal expansion (25°–300° C.) between about 97–100×10$^{-7}$/° C., an annealing point not lower than about 475° C., a strain point not lower than about 440° C., an electrical resistivity expressed as Log R greater than 9 at 250° C. and greater than 7 at 350° C., and a liquidus temperature below about 1100° C., said glass consisting essentially, expressed in terms of weight percent on the oxide basis, of

| | | | |
|---|---|---|---|
| $SiO_2$ | 55–60 | $K_2O$ | 5.75–10 |
| $Al_2O_3$ | 1–3 | $Na_2O + K_2O$ | 10.5–14 |
| $ZrO_2$ | 0–3.5 | $K_2O/Na_2O$(wt) | 1.6–2.6 |
| $Li_2O$ | 0.6–2 | $K_2O/Na_2O$(mol) | >1 |
| SrO | 7.5–13.5 | $CeO_2$ | 0.5–1 |
| BaO | 14–16 | $TiO_2$ | 0.25–1 |
| $Na_2O$ | 3–5 | $Sb_2O_3$ | 0.15–0.5 . |

2. A glass according to claim 1 wherein $CeO_2+TiO_2>1$.

3. A faceplate for a projection rear cathode ray tube comprising a glass essentially free from ZnO, PbO and other easily reducible metal oxides other than $Sb_2O_3$, which is essentially colorless, and which exhibits essentially no browning discoloration upon being exposed to high voltage electrons, a linear coefficient of thermal expansion (25°–300° C.) between about 97–100×10$^{-7}$/° C., an annealing point not lower than about 475° C., a strain point not lower than about 440° C., an electrical resistivity expressed as Log R greater than 9 at 250° C. and greater than 7 at 350° C., and a liquidus temperature below about 1100° C., said glass consisting essentially, expressed in terms of weight percent on the oxide basis, of

| | | | |
|---|---|---|---|
| $SiO_2$ | 55–60 | $K_2O$ | 5.75–10 |
| $Al_2O_3$ | 1–3 | $Na_2O+K_2O$ | 10.5–14 |
| $ZrO_2$ | 0–3.5 | $K_2O/Na_2O$(wt) | 1.6–2.6 |

-continued

| | | | |
|---|---|---|---|
| $Li_2O$ | 0.6–2 | $K_2O/Na_2O$(mol) | >1 |
| SrO | 7.5–13.5 | $CeO_2$ | 0.5–1 |
| BaO | 14–16 | $TiO_2$ | 0.25–1 |
| $Na_2O$ | 3–5 | $Sb_2O_3$ | 0.15–0.5. |

4. A faceplate according to claim 3 wherein $CeO_2 + TiO_2 > 1$.

* * * * *